US012607363B2

(12) United States Patent
Lim et al.

(10) Patent No.: US 12,607,363 B2
(45) Date of Patent: Apr. 21, 2026

(54) AUTO-OPEN DOOR-LOCK EQUIPMENT

(71) Applicant: DUAL POWER ELECTRONICS CO., LTD, Jeongeup-si (KR)

(72) Inventors: Jang-Joo Lim, Seoul (KR); Sang-Won Suh, Jeongeup-si (KR); Jung Gil Lee, Jeongeup-si (KR); Hee Chang Kim, Jeongeup-si (KR)

(73) Assignee: DUAL POWER ELECTRONICS CO., LTD, Jeongeup-si (KR)

( * ) Notice: Subject to any disclaimer, the term of this patent is extended or adjusted under 35 U.S.C. 154(b) by 185 days.

(21) Appl. No.: 18/532,028

(22) Filed: Dec. 7, 2023

(65) Prior Publication Data

US 2025/0075531 A1 Mar. 6, 2025

(30) Foreign Application Priority Data

Aug. 31, 2023 (KR) ........................ 10-2023-0115177

(51) Int. Cl.
*F24C 15/02* (2006.01)
*E05B 47/00* (2006.01)
*E05B 63/00* (2006.01)

(52) U.S. Cl.
CPC ........ *F24C 15/022* (2013.01); *E05B 47/0012* (2013.01); *E05B 2047/0017* (2013.01);
(Continued)

(58) Field of Classification Search
CPC ...... F24C 15/022; F24C 7/02; E05B 47/0607; E05B 47/0012; E05B 2063/0091;
(Continued)

(56) References Cited

U.S. PATENT DOCUMENTS

2005/0284465 A1* 12/2005 Courter ................. F24C 15/022
126/197
2019/0219269 A1* 7/2019 DeYoung ............. F24C 15/022
(Continued)

FOREIGN PATENT DOCUMENTS

KR 20070053951 A * 5/2007 ............. F24C 7/046
KR 10-1667916 B1 10/2016
KR 10-1915250 B1 11/2018

OTHER PUBLICATIONS

Annotated machine translation of KR-101667916-B1 with paragraph numbers (Year: 2016).*

*Primary Examiner* — Christine M Mills
*Assistant Examiner* — Peter H Watson
(74) *Attorney, Agent, or Firm* — Studebaker Brackett PLLC

(57) ABSTRACT

Provided is an auto-open door-lock device including a locking set and a control set. The control set includes a first motor that operates a locking lever and is connected with the locking set, a first micro switch that determines a rotation status of the first motor, a second motor that operates a latch and is connected with the locking set, and a second micro switch that determines a rotation status of the second motor. The locking set includes a locker that fastens a hook and receives a rotational force in a first direction based on a first center, the latch that receives a rotational force in a second direction based on a second center attached to one side, and the locking lever that moves a locking flange that implements a locked state by fastening the locker and including a lever hole track.

5 Claims, 15 Drawing Sheets

(52) U.S. Cl.
CPC ................. *E05B 2047/0036* (2013.01); *E05B 2047/0054* (2013.01); *E05B 2047/0067* (2013.01); *E05B 2063/0091* (2013.01)

(58) Field of Classification Search
CPC .......... E05B 53/00; E05B 81/16; E05B 81/20; E05C 3/24; E05C 3/30; D06F 37/28; D06F 37/42; D06F 39/14; H05B 6/6414; H05B 6/6417
See application file for complete search history.

(56) References Cited

U.S. PATENT DOCUMENTS

| | | | | |
|---|---|---|---|---|
| 2019/0316400 | A1* | 10/2019 | Shin ...................... | F24C 15/022 |
| 2023/0407689 | A1* | 12/2023 | DeYoung .............. | E05C 19/024 |

* cited by examiner

AUTO-OPEN DOOR-LOCK EQUIPMENT

CROSS-REFERENCE TO RELATED APPLICATION(S)

This application claims the benefit under 35 USC § 119 (a) of Korean Patent Application No. 10-2023-0115177 filed on Aug. 31, 2023 in the Korean Intellectual Property Office, the entire disclosure of which is incorporated herein by reference for all purposes.

BACKGROUND

1. Field

At least one example embodiment relates to an automatic opening (auto-open) door-lock device, and more particularly, to an auto-open door-lock device used for home appliances, for example, an oven and a microwave oven.

2. Description of Related Art

There are various types of home appliances in our daily lives. In particular, a home appliance that is used by inserting contents, for example, a washing machine, a dryer, a dishwasher, a microwave oven, and an oven, is installed with a door to block the inserted contents from the outside. A locking device that opens and closes a door is an essential part that constitutes a corresponding home appliance.

Until recently, various technologies related to a door-lock device are developed. Representative examples include Korean Patent Registration No. 10-1667916 titled "Door-lock apparatus for push and push" and Korean Patent Registration No. 10-1915250 titled "Manual door-lock device."

The door-lock apparatus for push and push relates to a door-lock device that automatically opens a door without a need for a user to open the door when an operation of a corresponding home appliance is terminated.

The door-lock apparatus for push and push includes a release button installed inside a body and configured to release a locked locker by releasing a binding force of a fastening member through a sliding operation and a driving unit configured to selectively control a door holding operation, a door locking operation, and an automatic door opening operation by a rotational operation of a rotational shaft with a cam protrusion on one side.

The manual door-lock device relates to a door-lock device that may be manually operated with a simple structure, which differs from an existing method that is electronically operated by a solenoid.

The door-lock apparatus for push and push used for home appliances has a complex operating process and frequently breaks down since an excessive force is applied to a torsion spring. The manual door-lock device has a device stability, but is inconvenient in that a door lock is opened or closed by a human action and an irregular force is applied to the device, which also often causes a malfunction.

Therefore, there is a need for a door-lock device to implement an organic combination between components and various functions.

SUMMARY

An objective of at least one example embodiment is to provide an automatic opening (auto-open) door-lock device applicable to home appliances, for example, an oven and a microwave oven.

Also, an objective of at least one example embodiment is to provide an auto-open door-lock device that barely malfunctions and is implementable in a compact size.

Also, an objective of at least one example embodiment is to provide an auto-open door-lock device having an organic connection between parts constituting the device, small moving clearance of parts, and superior durability.

According to an example embodiment, there is provided an auto-open door-lock device including a locking set configured to couple with or decouple from a hook installed on a door; and a control set configured to provide power to the locking set. The control set includes a first motor configured to operate a locking lever, a first micro switch configured to determine a rotation status of the first motor, a first line configured to connect the locking set and the first motor, a second motor configured to operate a latch, a second micro switch configured to determine a rotation status of the second motor, and a second line configured to connect the locking set and the second motor, the locking set includes a locker configured to fasten the hook and to receive a rotational force in a first direction based on a first center, the latch configured to receive a rotational force in a second direction based on a second center attached to one side, and the locking lever configured to move a locking flange that implements a locked state by fastening the locker and including a lever hole track configured to connect to the first line, and the locking set and the control set are separate from each other.

According to some example embodiments, there is provided an auto-open door-lock device that may be implemented in a compact size and installed in various home appliances.

Also, according to some example embodiments, there is provided an auto-open door-lock device that barely malfunctions and is stable due to an organic combination between parts.

Also, according to some example embodiments, since push limits load on a device due to push, a failure risk of the device may decrease.

Also, according to some example embodiments, since accessories installed in a heating area and accessories installed in a non-heating area are installed separately, there is no risk of failure due to heat.

The aforementioned features and effects of the disclosure will be apparent from the following detailed description related to the accompanying drawings and accordingly those skilled in the art to which the disclosure pertains may easily implement the technical spirit of the disclosure.

BRIEF DESCRIPTION OF THE DRAWINGS

These and/or other aspects, features, and advantages of the disclosure will become apparent and more readily appreciated from the following description of example embodiments, taken in conjunction with the accompanying drawings of which.

DETAILED DESCRIPTION

Specific structural or functional descriptions related to example embodiments according to the concept of the disclosure set forth herein are simply provided to explain the example embodiments according to the concept of the disclosure and the example embodiments according to the concept of the disclosure may be implemented in various forms and are not limited to the example embodiments described herein.

Figure 1:
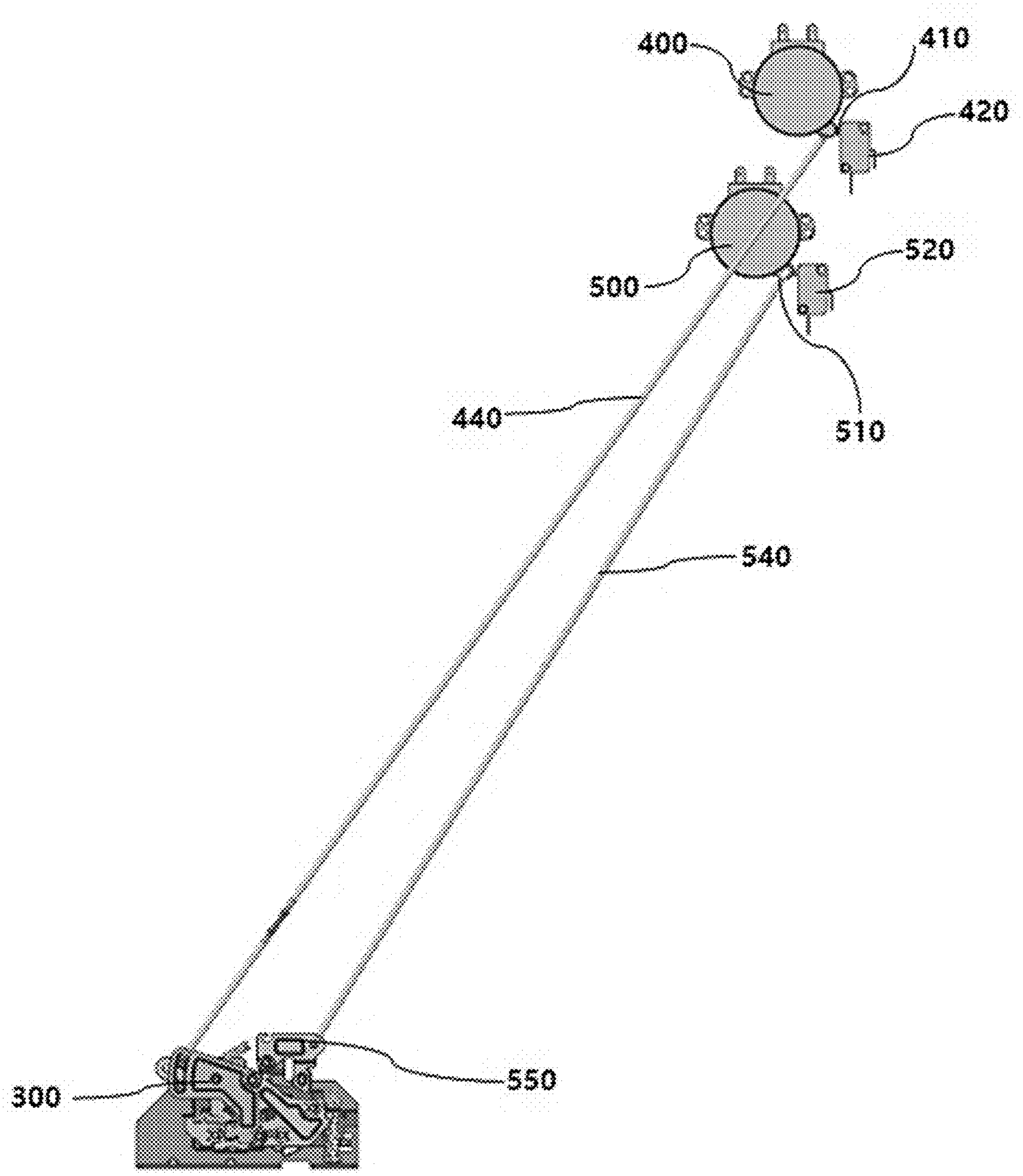
FIG. 1 is a plan view of an automatic opening (auto-open) door-lock device according to an example embodiment.

FIG. 1 is a plan view of an automatic opening (auto-open) door-lock device according to an example embodiment.

Figure 2:
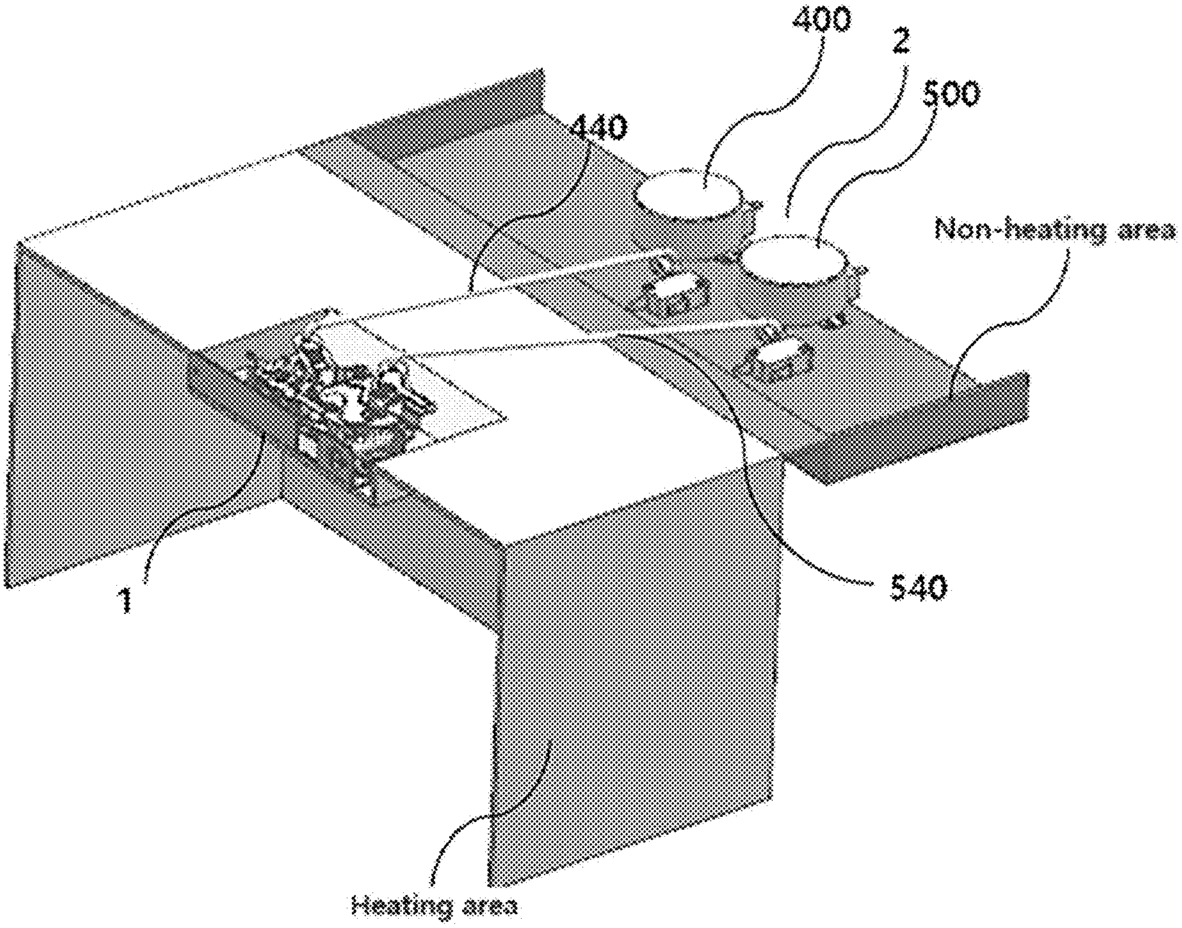
FIG. 2 is a perspective view illustrating an actual installation of an auto-open door-lock device according to an example embodiment.

FIG. 2 is a perspective view illustrating an actual installation of an auto-open door-lock device according to an example embodiment.

Figure 3:
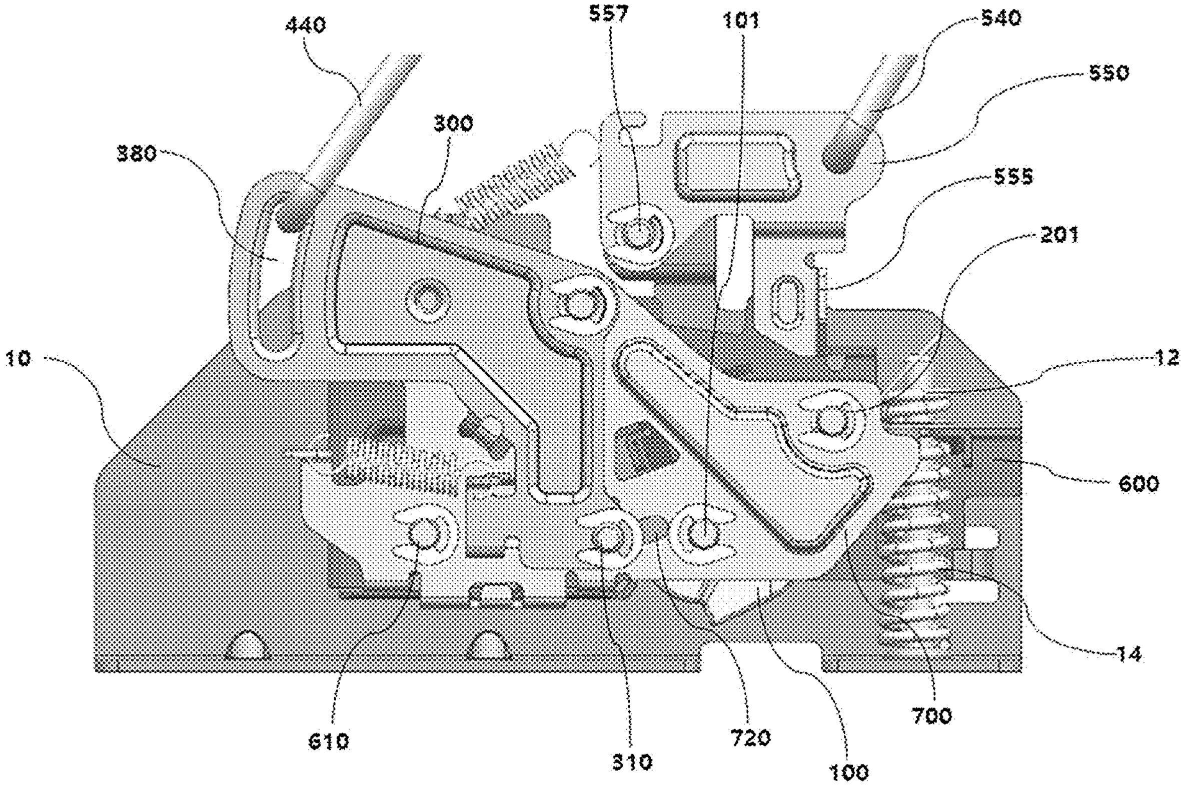
FIG. 3 is a plan view of a locking set according to an example embodiment.

FIG. 3 is a plan view of a locking set according to an example embodiment.

Referring to FIGS. 1 to 3, an auto-open door-lock device according to an example embodiment refers to an auto-open door-lock device that includes a locking set 1 configured to couple with or decouple from a hook 20 installed on a door and a control set 2 configured to provide power to the locking set. Here, the control set 2 includes a first motor 400 configured to operate a locking lever 300, a first micro switch 420 configured to determine a rotation status of the first motor 400, a first line 440 configured to connect the locking set and the first motor 400, a second motor 500 configured to operate a latch 200, a second micro switch 520 configured to determine a rotation status of the second motor 500, and a second line 540 configured to connect the locking set and the second motor 500. The locking set 1 may include a locker 100 configured to fasten the hook 20 and to receive a rotational force in a first direction based on a first center 101, the latch 200 configured to receive a rotational force in a second direction based on a second center 201 attached to one side, and the locking lever 300 configured to move a locking flange 310 that implements a locked state by fastening the locker 100 and including a lever hole track 380 configured to connect to the first line 440. Here, the locking set 1 and the control set 2 are separate from each other.

In the auto-open door-lock device according to an example embodiment that is divided into the locking set 1 and the control set 2, components of the control set 2 that are susceptible to heat are installed in a non-heating area such that the entire auto-open door-lock device does not malfunction due to heat, as illustrated in FIG. 2.

As illustrated in FIG. 1, the locking set 1 and the control set 2 are connected using the first line 440 and the second line 540.

The first line 440 and the second line 540 may be beams made of a metal material with guaranteed heat resistance, but are not necessarily limited thereto. Any methods capable of connecting a movement of the first motor 400 and a movement of the second motor 500 to the locking lever 300 and a bridge 550 of the locking set 1, respectively, while ensuring heat resistance, may be adopted.

The locking lever 300 includes the lever hole track 380 configured to connect to the first motor 400 through the first line 440, the lever hole track 380 is a hole with a predetermined length that is formed in a longitudinal direction along a heading direction of the first line 440, and the first line 440 rotates the locking lever 300 while moving along the lever hole track 380 in response to a movement of the first motor 400. The latch 200 performs a lifting motion by rotation of the bridge 550 connected to the second motor 500 through the second line 540.

Also, an operation of the first motor 400 is controlled to maintain the locked state when a temperature sensor indicates a first reference temperature or more. Also, an operation of the second motor 500 is controlled to automatically open a door when a temperature sensor indicates a second reference temperature or less.

Here, the first reference temperature and the second reference temperature may be existing set temperatures or setting values thereof may be changed by a user.

Figure 4A:
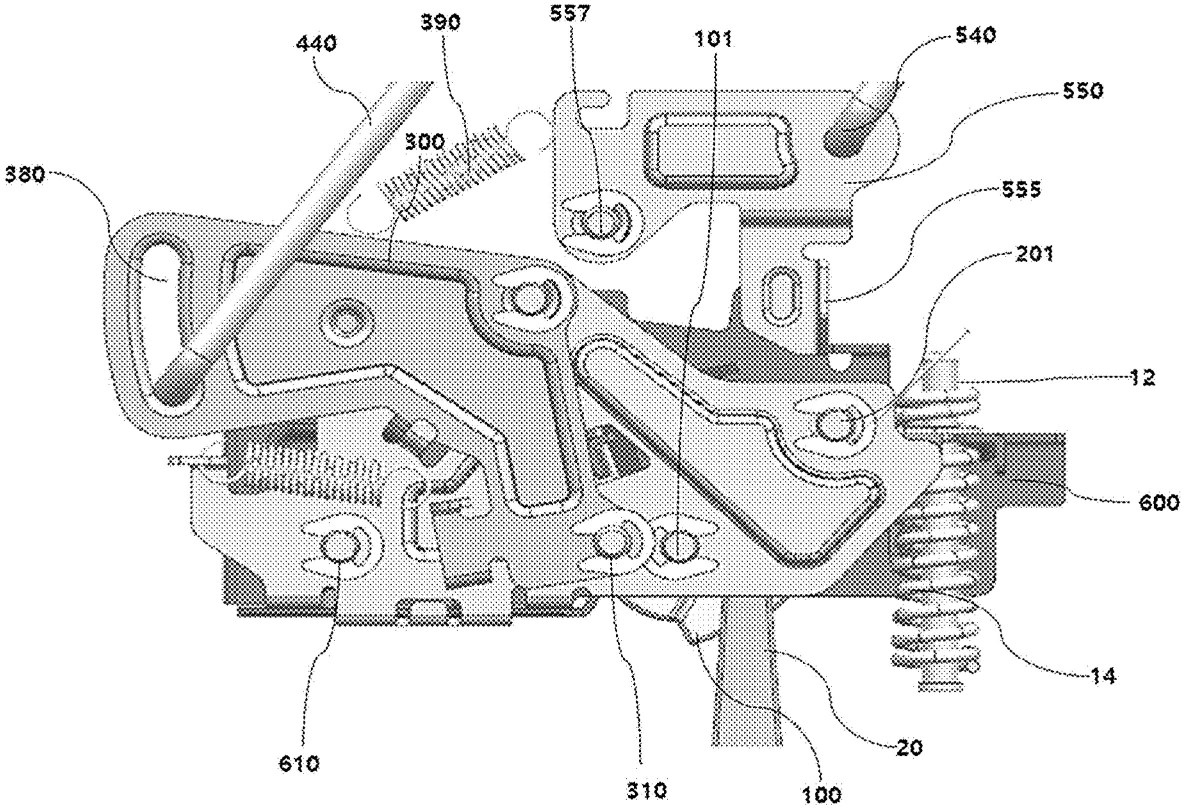
FIG. 4A is a plan view of a locking set in a locked state according to an example embodiment.

FIG. 4A is a plan view of a locking set in a locked state according to an example embodiment.

Figure 4B:
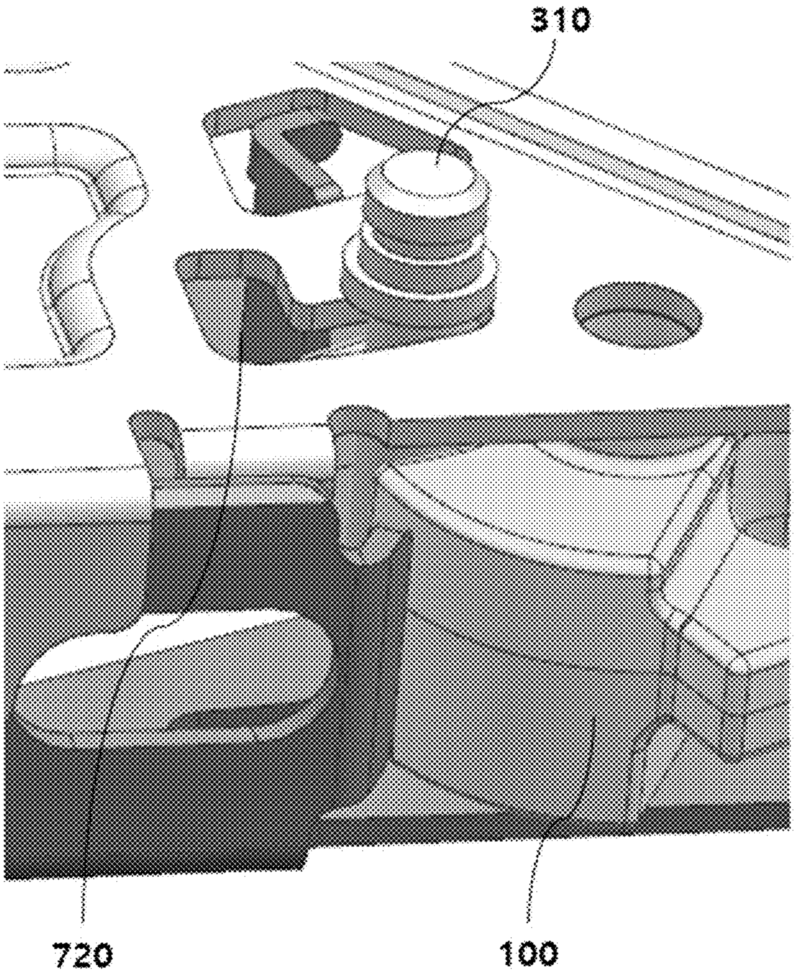
FIG. 4B is an enlarged perspective view of a flange track in a locked state according to an example embodiment.

FIG. 4B is an enlarged perspective view of a flange track in a locked state according to an example embodiment.

Figure 4C:
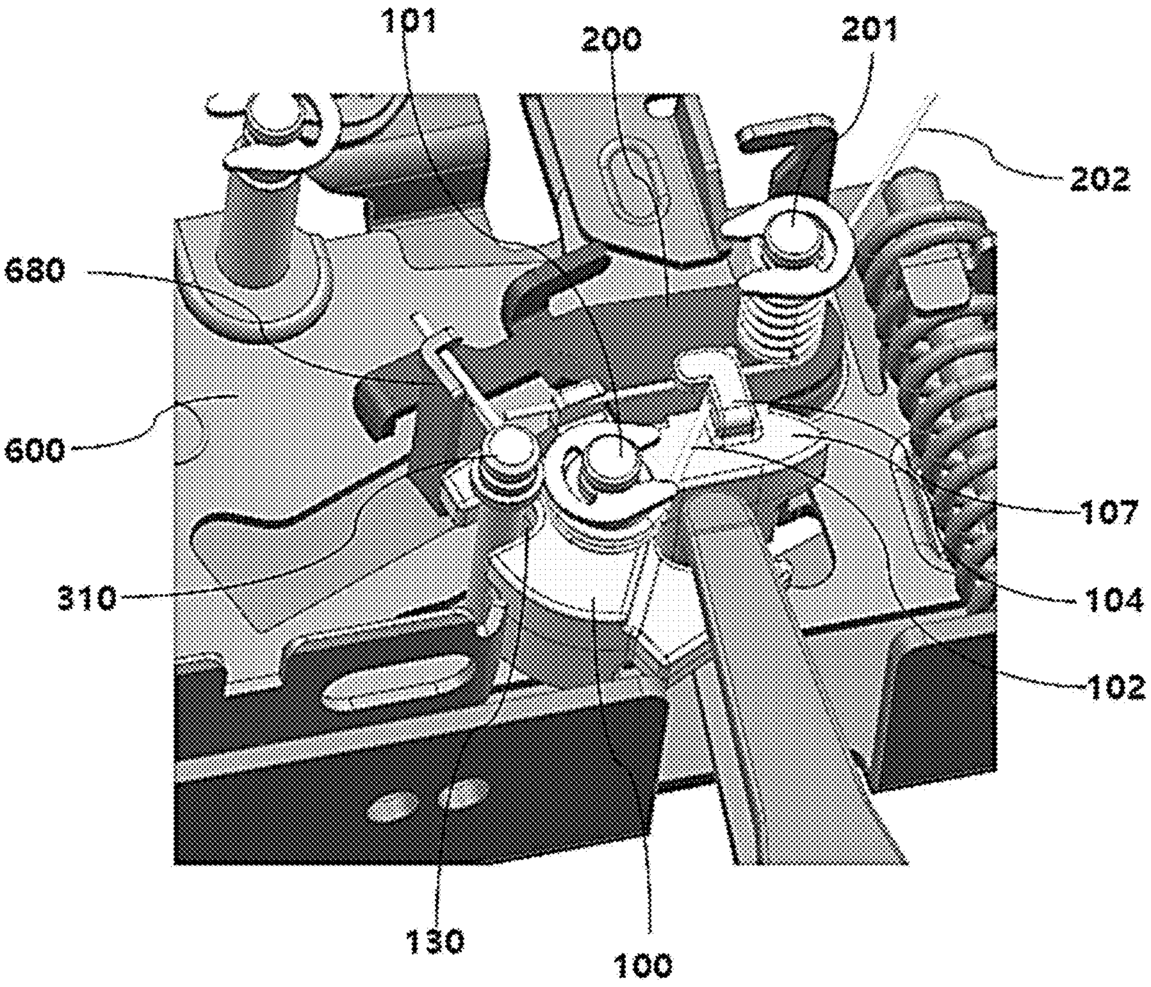
FIG. 4C is an enlarged perspective view of a locker in a locked state according to an example embodiment.

FIG. 4C is an enlarged perspective view of a locker in a locked state according to an example embodiment.

A locked state of an auto-open door-lock device according to an example embodiment will be described with reference to FIG. 4A to 4C.

In the auto-open door-lock device according to an example embodiment, as the first motor 400 operates, the first line 440 moves. Here, the first line 440 moves along the lever hole track 380 of the locking lever 300 and pushes the locking lever 300 at an end of the lever hole track 380.

The locking lever 300 pushes the locking flange 310 while rotating counterclockwise, and the locking flange 310 moves along a flange track 720 as illustrated in FIG. 4B and engages with a groove portion 130 of the locker 100 as illustrated in FIG. 4C.

The locking lever 300 has a restoring force to move clockwise by a spring 390 and, to counter this, allows the locking flange 310 to engage with the groove portion 130 while the first line 440 moves along the lever hole track 380 implemented in a circular shape.

Figure 5:
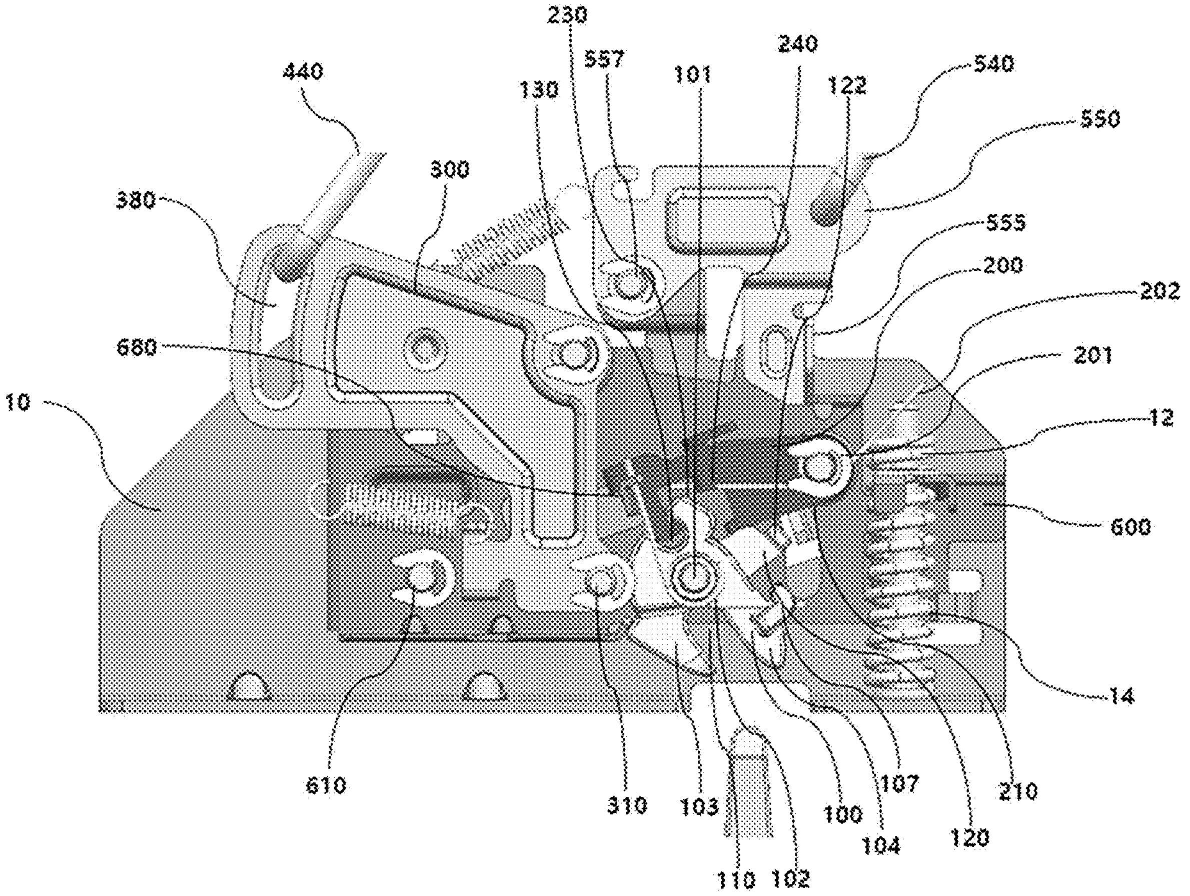
FIG. 5 is a cross-sectional view illustrating an open state of an auto-open door-lock device with a hook removed from a locker.

FIG. 5 is a cross-sectional view illustrating an open state of an auto-open door-lock device with a hook removed from a locker.

Figure 6:
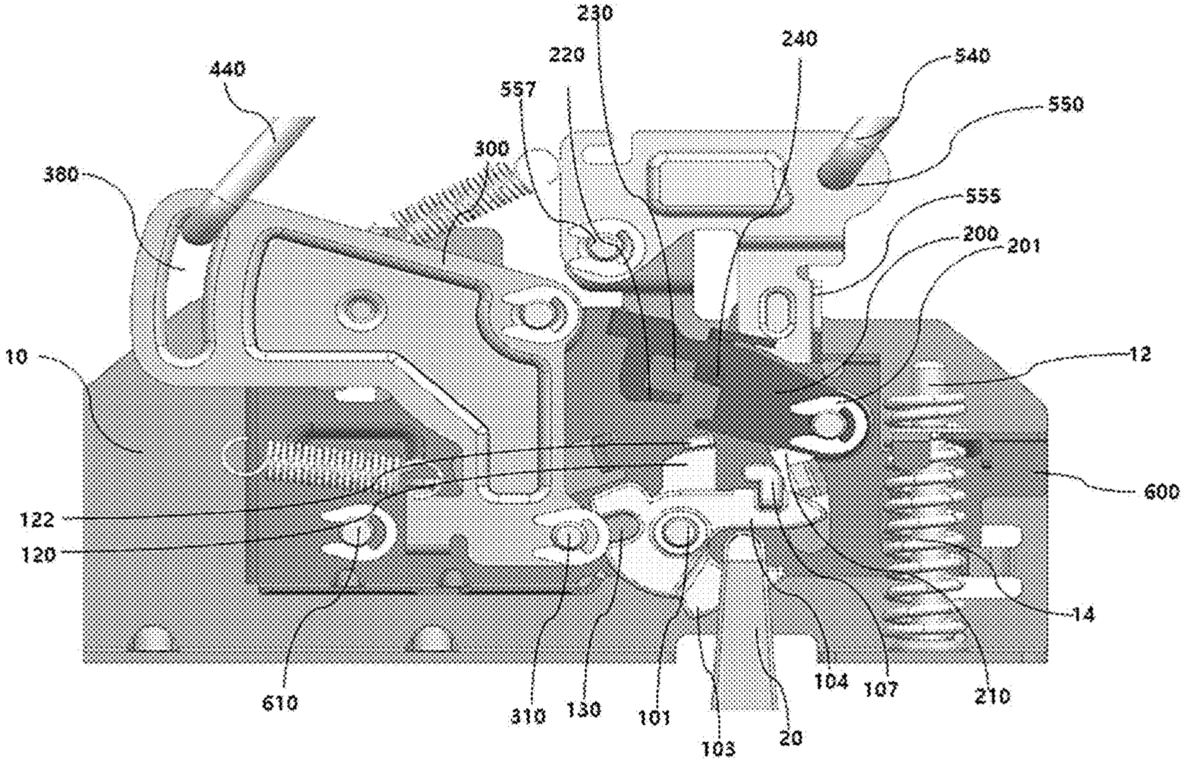
FIG. 6 is a cross-sectional view illustrating a state of a point in time at which a hook fastens to a seating portion.

FIG. 6 is a cross-sectional view illustrating a state of a point in time at which a hook fastens to a seating portion.

Figure 7:
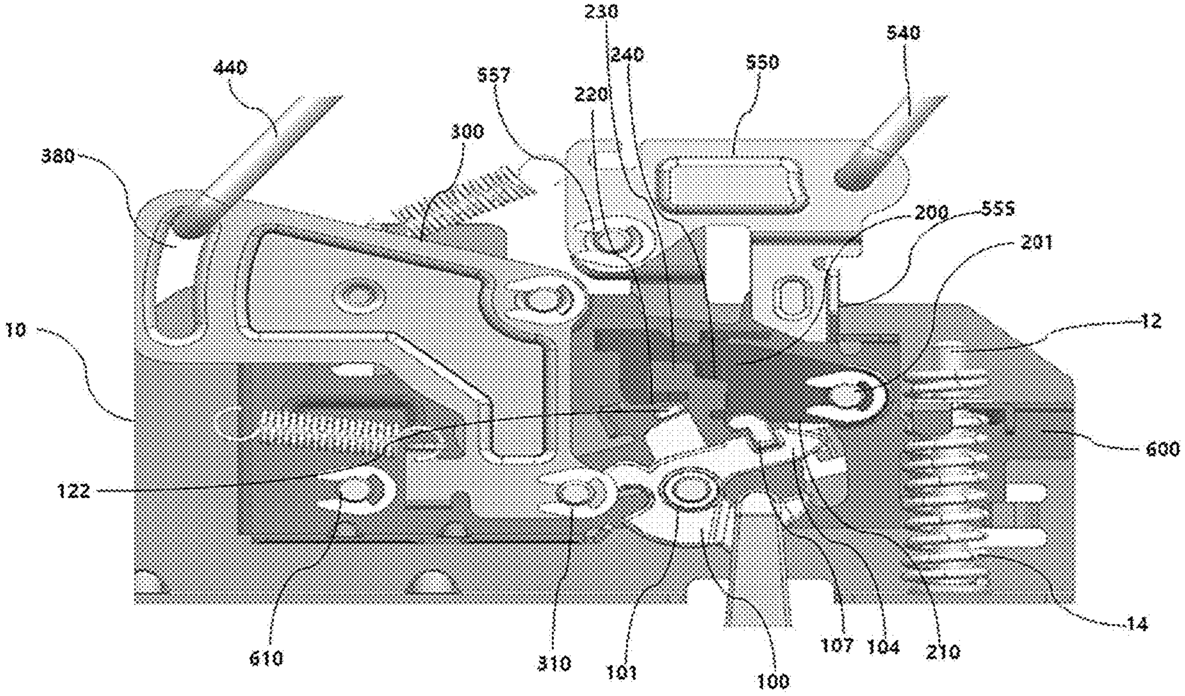
FIG. 7 is a cross-sectional view illustrating a state of a point in time at which a hook pushes a second ring.

FIG. 7 is a cross-sectional view illustrating a state of a point in time at which a hook pushes a second ring.

Figure 8:
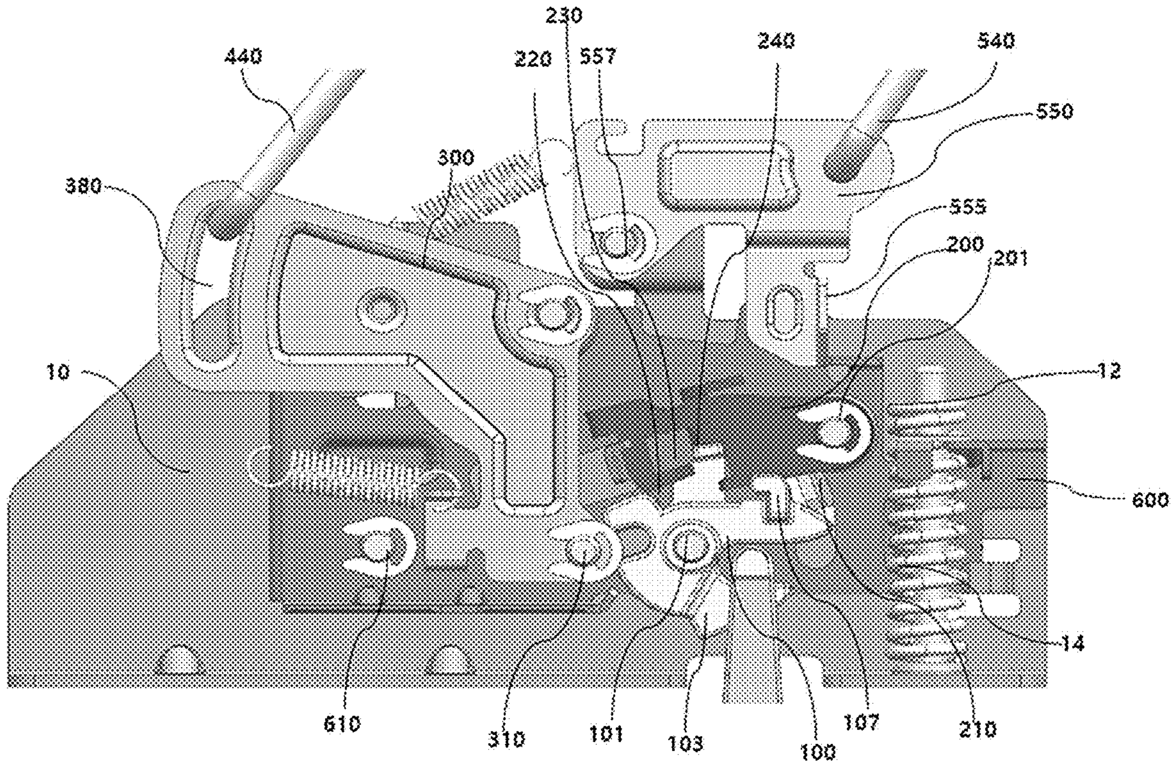
FIG. 8 is a cross-sectional view illustrating a case in which a locker is closed.

FIG. 8 is a cross-sectional view illustrating a case in which a locker is closed.

Figure 9:
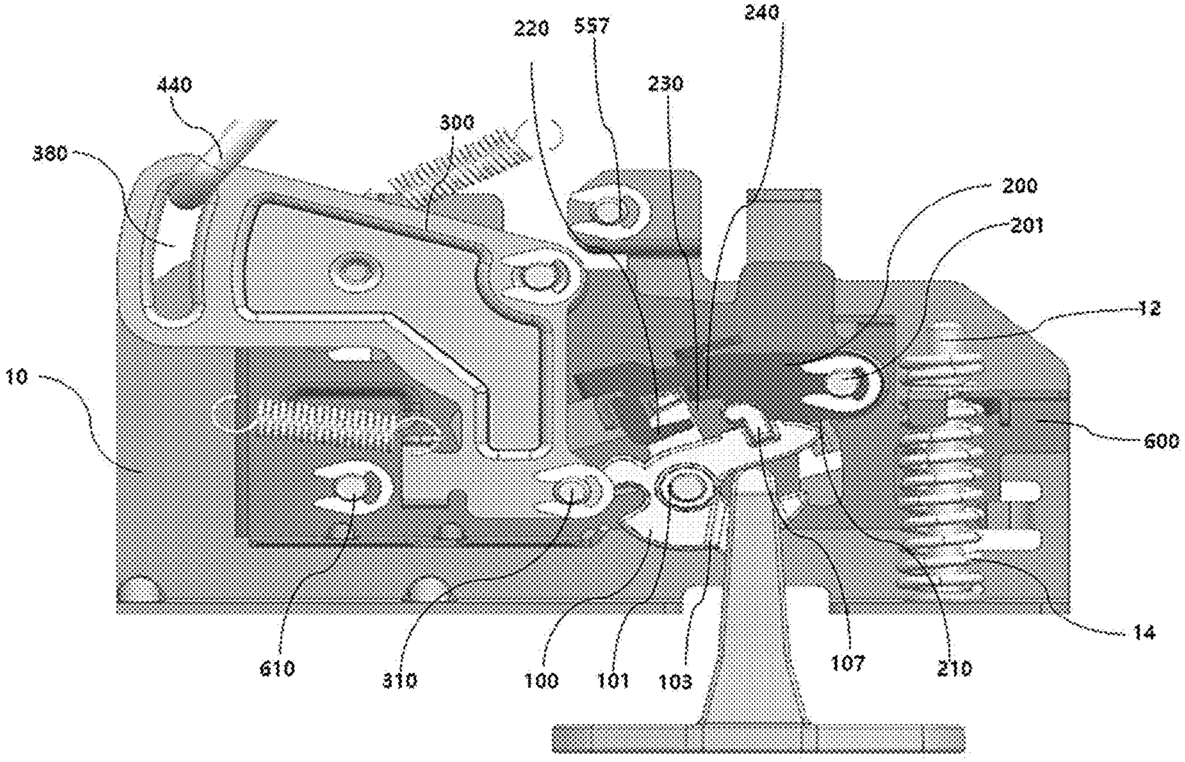
FIG. 9 is a cross-sectional view illustrating a case in which closing of a locker is completed.

FIG. 9 is a cross-sectional view illustrating a case in which closing of a locker is completed.

Figure 10:
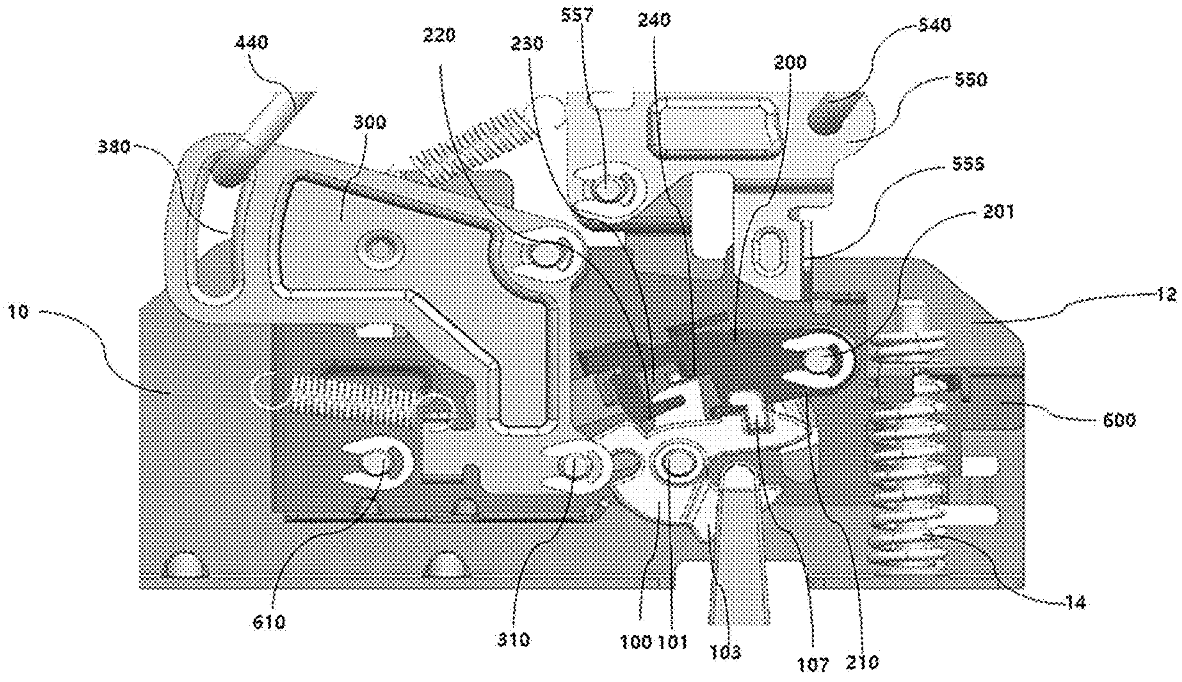
FIG. 10 is a cross-sectional view illustrating a state in which a locker starts to separate from a latch.

FIG. 10 is a cross-sectional view illustrating a state in which a locker starts to separate from a latch.

Figure 11:
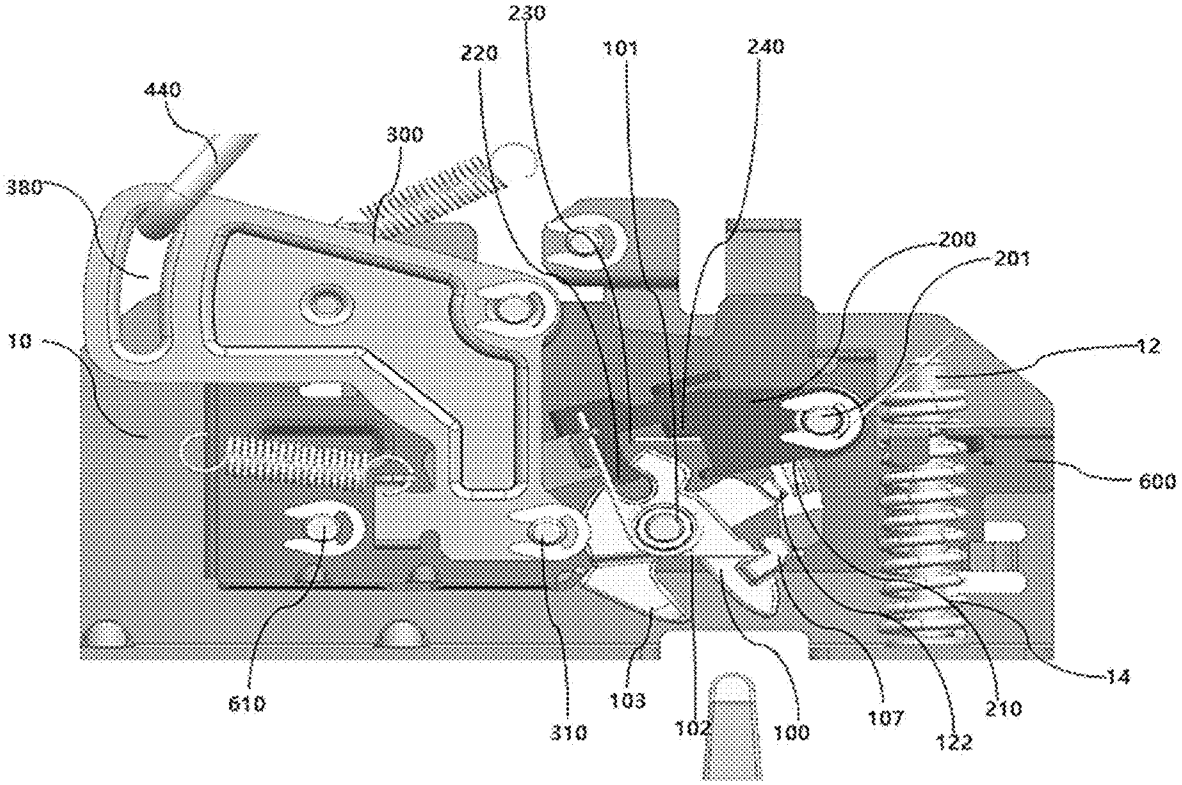
FIG. 11 is a cross-sectional view illustrating a state in which separation of a locker and a latch is completed.

FIG. 11 is a cross-sectional view illustrating a state in which separation of a locker and a latch is completed.

Referring to FIG. 5, the auto-open door-lock device according to an example embodiment includes the locker 100 configured to fasten the hook 20 and to receive a rotational force in a first direction by installing a first torsion spring 102 at the first center 101 and the latch 200 configured to rotate based on the second center 201 attached to one side and to receive a rotational force by installing a second torsion spring 202.

The first direction may represent a clockwise rotation and the second direction may represent a counterclockwise rotation, but are not necessarily limited thereto.

The auto-open door-lock device of FIG. 5 may be implemented by directly or indirectly attaching internal components to a base 10.

The base 10, the locker 100, and the latch 200 that constitute the auto-open door-lock device according to an example embodiment may be made of a hard metal material, and without being limited thereto, may be made of a hard plastic material Also, a heat-resistant material may be used depending on a function of a corresponding home appliance in which the door-lock device is installed.

The locker 100 according to an example embodiment receives a continuous rotational force in a clockwise direction by the first torsion spring 102. When the hook 20 is introduced into the locker 100, the locker 100 is forced to have a counterclockwise rotational force opposite to a clockwise rotational force. Here, it is expected that the locker 100 will rotate counterclockwise as the hook 20 is introduced with a stronger external force than the rotational force of the first torsion spring 102.

In detail, the locker 100 includes a seating portion 110 formed by a first ring 103 and a second ring 104, a stopping portion 120 configured to protrude from a lower portion of the second ring 104, a stopping piece 122 in a bent shape at one end of the stopping portion 120, and the groove portion 130 in a recessed shape on an outer edge.

The seating portion 110 is a portion into which the hook 20 is introduced and fastens. Although the seating portion 110 is formed in a U shape in FIG. 5, the seating portion 110 may be implemented in various shapes to which the hook 20 introduced from outside may fasten.

The first ring 103 and the second ring 104 may be integrally formed and lengths of the first ring 103 and the second ring 104 may differ from each other when forming the seating portion 110.

The locker 100 according to an example embodiment includes the stopping portion 120. The stopping portion 120 is formed in a protruding form in the lower portion of the second ring 104. The stopping portion 120 may be integrally formed with the first ring 103 and the second ring 104 to be simultaneously rotatable with rotation of the first ring 103 and the second ring 104.

Also, as illustrated in FIG. 5, the stopping piece 122 in the bent shape is formed at one end of the stopping portion 120. The stopping piece 122 is located at the edge of the stopping portion 120 and is bent in an opposite direction of the base 10.

The stopping piece 122 refers to an area for controlling a movement of the locker 100 by the latch 200 and may be solidly and firmly manufactured in an integral form with the stopping portion 120.

Also, the groove portion 130 in a recessed shape is formed on the outer edge of the locker 100. As illustrated in FIG. 5, the groove portion 130 may be formed in a recessed shape with a predetermined depth on outer periphery of a point at which the first ring 103 and the second ring 104 meet, but is not limited thereto.

Also, referring to FIG. 5, the locker 100 includes a locker ring 107 to which the first torsion spring 102 configured to provide the rotational force based on the first center 101 fastens. The locker ring 107 is implemented in a protruding shape on the side of the second ring 104, but is not limited thereto. As a housing ring 680 and the locker ring 107 are connected through the first torsion spring 102, the locker 100 receives a continuous rotational force in one direction.

The latch 200 according to an example embodiment receives a continuous rotational force in a direction opposite to the first direction that is a rotational direction of the locker 100, which is caused by the second torsion spring 202 attached at one end of the latch 200.

Referring to FIGS. 5 and 6, the latch 200 according to an example embodiment includes a first slope 210 that is an edge formed in a direction of the locker 100, a second slope 220 that is an edge formed in a direction of the locker 100 and separate from the first slope 210 at a different height, an accommodation portion 230 configured to accommodate the stopping piece 122 to fasten the locker 100, and a protruding piece 240 in a bent shape at one edge of the accommodation portion 230.

The first slope 210 formed in the latch 200 is formed in the direction of the locker 100. In detail, the edge of the latch 200 in which the stopping piece 122 rides and moves by the rotation of the locker 100 is the first slope 210.

The second slope 220 is the edge formed in the direction of the locker 100 like the first slope 210. In detail, similar to the first slope 210, the second slope 220 is a slope on which the stopping piece 122 is seated by the rotation of the locker 100. The second slope 220 is separate from the first slope 210, and a height at which the first slope 210 is formed is different from a height at which the second slope 220 is formed. Also, as illustrated in FIGS. 5 and 6, the height at which the second slope 220 is formed is designed to be lower than the height at which the first slope 210 is formed.

The latch 200 according to an example embodiment is open only in an edge area that includes the first slope 210 and the second slope 220 and includes the accommodation portion 230 that is an open space in a hook shape.

Referring to FIGS. 5 and 6, the accommodation portion 230 is a space in which the stopping piece 122 is accommodated to fasten the locker 100. The accommodation portion 230 allows the stopping piece 122 to move and the latch 200 to couple with or decouple from the locker 100, which is further described below.

The latch 200 according to an example embodiment includes the protruding piece 240 in the bent shape at one edge of the accommodation portion 230. As illustrated in FIGS. 5 and 6, the protruding piece 240 has a shape bent at an angle to the opposite side of the base 10. That is, the protruding piece 240 is in a bent shape as if a slope is formed with respect to a virtual surface of the latch 200 formed by the accommodation portion 230.

Each component of the latch 200 may represent a detailed component part of the latch 200 that is integrally formed.

The auto-open door-lock device according to an example embodiment includes the locking lever 300 having the locking flange 310 configured to move by the first motor 400 and to engage with the groove portion 130.

The locking lever 300 rotates in such a manner that one end of the locking lever 300 couples with the base 10 and is pushed and moves by a first motor arm 410. In this manner, the locking flange 310 moves toward the locker 100 and engages with the groove portion 130, thereby preventing the locker 100 from rotating.

In particular, in the case of an oven, a heating and cleaning process of heating oil stuck in the oven to a temperature of 300 degrees and blowing the same into the air during cooking is periodically performed. During this process, a door of the oven needs to be maintained in an automatically locked state to not be opened.

Here, as illustrated in FIGS. 5 and 6, the first motor 400 rotates, the first motor arm 410 pulls the first line 440, and the first line 440 moves in the lever hole track 380 and pushes the locking lever 300 such that the locking flange 310 insert into the groove portion 130 of the locker 100 and, at the same time, the first motor arm 410 presses the first micro switch 420 to lock the locker 100.

As illustrated in FIG. 5, in the auto-open door-lock device according to an example embodiment, the second motor 500 is connected to the bridge 550 through the second line 540. The bridge 550 rotates based on a fifth center 557 such that an elevation step 555 of the bridge 550 digs under the latch 200 and lifts the latch 200. A detailed operation for automatic opening (auto-open) is described below.

Referring to FIG. 5, the auto-open door-lock device according to an example embodiment includes a housing bracket 600 and a separate bracket 700.

The housing bracket 600 forms a space in which the locker 100 and the latch 200 are mounted and is connected to the base 10 using a fourth center 610.

Also, one end of a spring 14 configured to couple with outer peripheral surface of a fastening rod 12 fastened to the base 10 is coupled with one upper side of the housing bracket 600. A fastening member (not shown) formed nearby may couple with a housing track 630 formed in the housing bracket 600 such that the housing bracket 600 may rotate at a predetermined angle along the housing track 630 based on the fourth center 610.

The auto-open door-lock device has an issue that a door cannot be opened if a malfunction occurs while the door is closed. In this case, if the door is pulled with a relatively strong force, the locker 100 is pulled by the hook 20 and the locker 100 is caught on a stopping step formed on the housing bracket 600.

When the door is pulled by further applying an external force, the housing bracket 600 rotates based on the fourth center 610. If the door is pulled with a strong force capable of countering an elastic force of the spring 14 on the opposite side of the fourth center 610, the locker 100 is forced to rotate and the hook 20 falls out of the first ring 103 of the locker 100.

That is, by constructing the housing bracket 600 as in the example embodiment, the locker 100 and the hook 20 may be separated in an emergency.

The separate bracket 700 is attached opposite the housing bracket 600. A flange track 720 on which the aforementioned locking flange 310 may move is formed on the side of the separate bracket 700.

A configuration of the auto-open door-lock device according to an example embodiment is described above. Hereinafter, a closing process of the auto-open door-lock device according to an example embodiment through an opening process thereof through push will be described with reference to FIGS. 6 to 11.

Referring to FIG. 6, the hook 20 rotates the locker 100 while pushing the locker 100 counterclockwise until the hook 20 is caught on the seating portion 110 of the locker 100. While the stopping portion 120 of the locker 100 rotates together, the stopping piece 122 of the stopping portion 120 becomes in contact with the first slope 210 of the latch 200 and rotates the latch 200 clockwise.

Referring to FIG. 7, if the hook 20 further pushes the second ring 104, the stopping piece 122 moves on the second slope 220 and the latch 200 moves counterclockwise by the second torsion spring 202. The locker 100 receives a continuous clockwise elastic force by the first torsion spring 102. If the locker 100 rotates clockwise in a state in which the second slope 220 and the stopping piece 122 are in contact as illustrated in FIG. 7, the stopping piece 122 is introduced into a space of the accommodation portion 230 that is formed in the latch 200.

If the stopping piece 122 of the locker 100 is introduced into the accommodation portion 230 as illustrated in FIG. 8, the stopping piece 122 is seated in the protruding piece 240 of the latch 200.

FIG. 8 illustrates a process in which the hook 20 is caught on the locker 100 and closed. FIG. 9 illustrates a state in which the stopping piece 122 is seated on the accommodation portion 230 of the latch 200 and the door is closed due to a rotational force of the locker 100 in the first direction and a rotational force of the latch 200 in the second direction.

If the door is pushed in a closed state, the hook 20 pushes the second ring 104 and, as illustrated in FIG. 10, while the stopping piece 122 falls behind the latch 200 while riding and sliding on the protruding piece 240 in an obliquely bent shape.

When separation of the locker 100 and the latch 200 is completed, the locker 100 rotates in an open state as illustrated in FIG. 11 such that the hook 20 falls out of the seating portion 110 of the locker 100 and the door is opened.

The auto-open door-lock device according to an example embodiment may be opened by push using a mechanical shape and a rotational force by a torsion spring.

As described above, the auto-open door-lock device according to an example embodiment may push and open the door when cooking starts or when cooking ends. Also, when cooking ends, the door-lock device may be automatically released to open the door.

Figure 12:
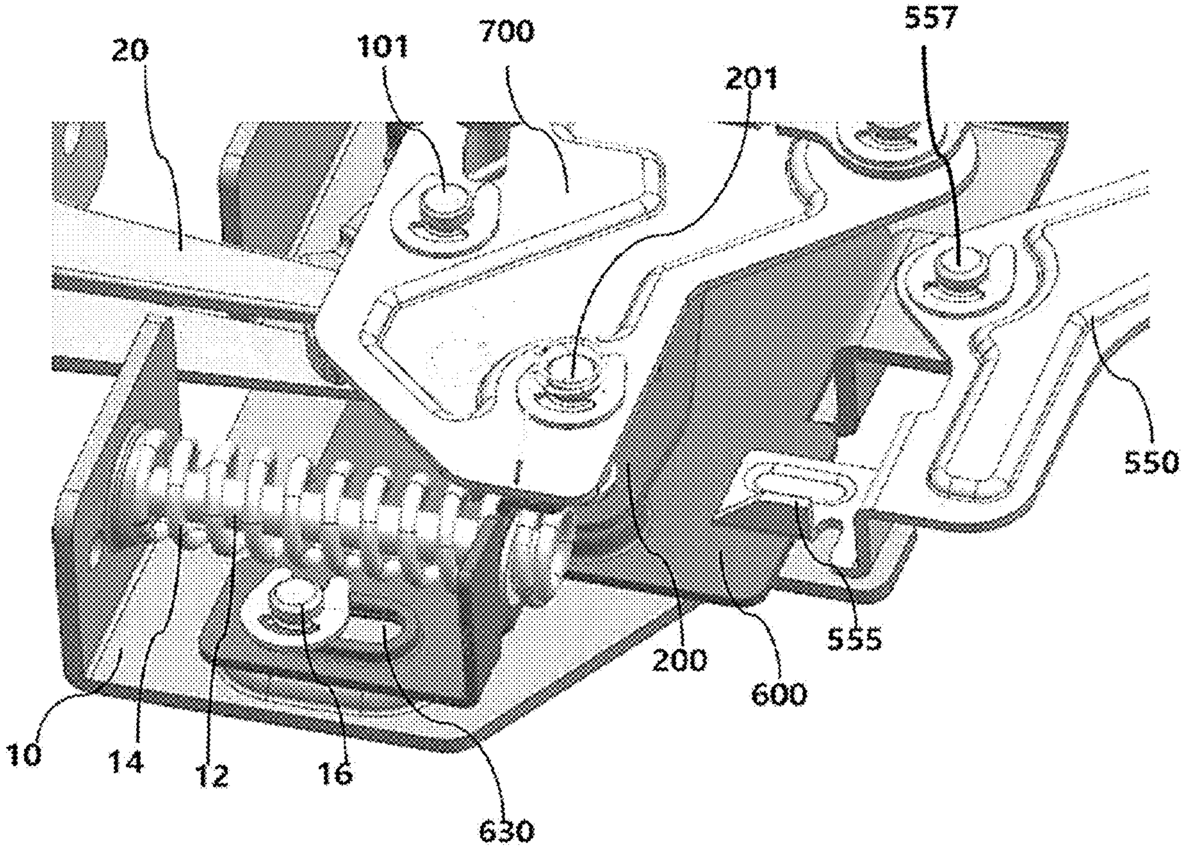
FIGS. 12 and 13 are perspective views illustrating an automatic opening operation state.
Figure 13:
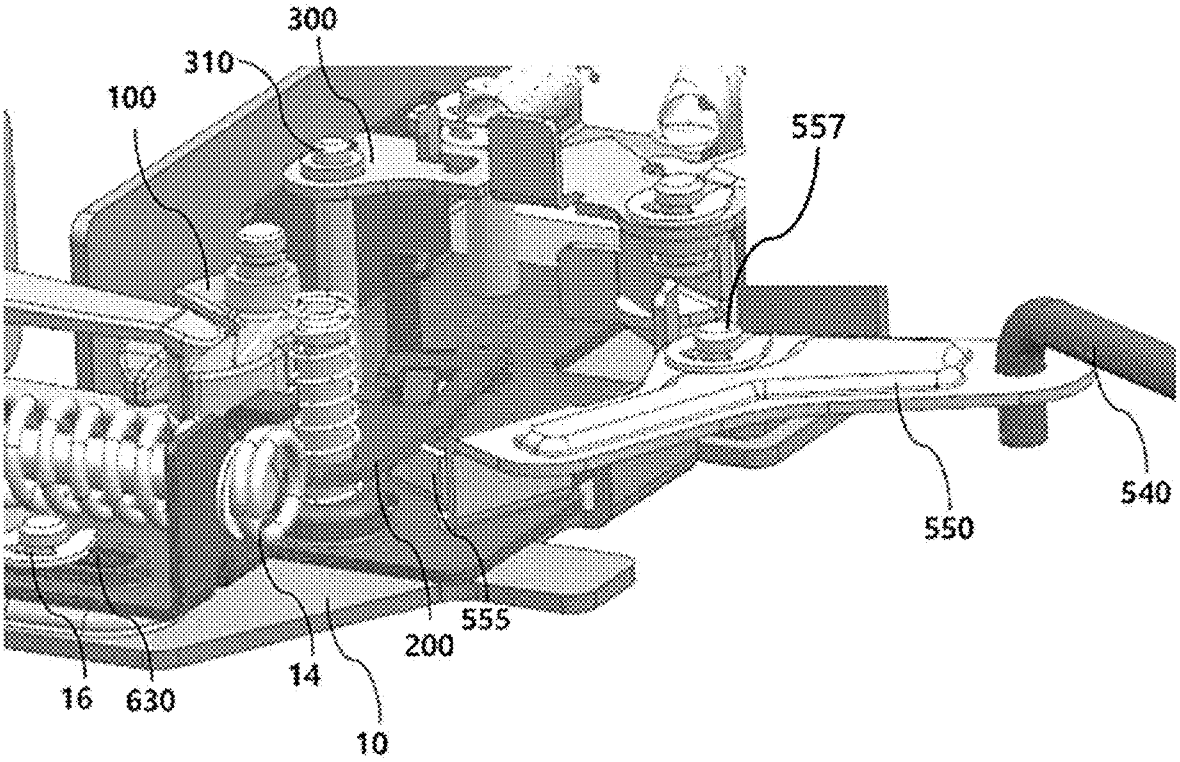

FIGS. 12 and 13 are perspective views illustrating an automatic opening operation state.

Referring to FIGS. 12 and 13, the bridge 550 includes the elevation step 555 configured to elevate a predetermined area of the latch 200 and having a diagonally protruding edge. Referring to FIG. 12, since a diagonal line of the elevation step 555 is toward the latch 200 and the stopping piece 122 is accommodated in the accommodation portion 230 inside the latch 200, the hook 20 is received in the seating portion 110 of the locker 100 and is in a closed state.

Referring to FIGS. 1 and 13, if the second motor 500 operates to pull the second line 540 and the bridge 550, the bridge 550 rotates based on the fifth center 557 such that the elevation step 555 rides into the lower portion of the latch 200 and pushes up to induce the stopping piece 122 located in the accommodation portion 230 of the latch 200 to fall out.

If the stopping piece 122 falls out of the accommodation portion 230 of the latch 200, the hook 20 falls to the outside while rotating by a restoring force of the locker 100 in the first direction and the door is opened.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An automatic opening (auto open) door-lock device comprising:

a locking set configured to couple with or decouple from a hook installed on a door; and a control set configured to provide power to the locking set, wherein the control set comprises a first motor configured to operate a locking lever, a first micro switch configured to determine a rotation status of the first motor, a first line configured to connect the locking set and the first motor, a second motor configured to operate a latch, a second micro switch configured to determine a rotation status of the second motor, and a second line configured to connect the locking set and the second motor, the locking set comprises a locker configured to fasten the hook and to receive a rotational force in a first direction based on a first center, the latch configured to receive a rotational force in a second direction based on a second center attached to one side, and the locking lever configured to move a locking pin having a flange that implements a locked state by fastening the locker and including a lever hole track configured to connect to the first line, the locking set and the control set are separate from each other, wherein the locking set further comprises a bridge having an upper face, a lower face, and a step connecting the upper and lower faces, the upper face of the bridge includes a fifth center configured to rotate the bridge in response to operation of the second motor through the second line, and one end of the lower face of the bridge includes an elevation step having a diagonally protruding edge, wherein the elevation step is configured to slide into a lower portion of the latch to lift the latch by rotation of the bridge.

2. The automatic opening door-lock device of claim 1, wherein the lever hole track is a hole with a predetermined length that is formed in a longitudinal direction along a heading direction of the first line.

3. The automatic opening door-lock device of claim 1, wherein the locker comprises a seating portion formed by a first protrusion and a second protrusion and to which the hook fastens, a stopping portion configured to protrude from a lower portion of the second protrusion, a stopping piece in a bent shape at one end of the stopping portion, a groove portion in a recessed shape on an outer edge, and a locker protrusion configured to connect to a housing protrusion formed in a housing bracket through a first torsion spring, and the latch comprises a first slope that is an edge formed in a direction of the locker, a second slope that is an edge formed in a direction of the locker and separate from the first slope at a different height, an accommodation portion configured to accommodate the stopping piece to fasten the locker, and a protruding piece in an obliquely bent shape at one edge of the accommodation portion.

4. The automatic opening door-lock device of claim 1, wherein an operation of the first motor is controlled to maintain the locked state when a temperature sensor indicates a first reference temperature or more.

5. The automatic opening door-lock device of claim 1, wherein an operation of the second motor is controlled to automatically open a door when a temperature sensor indicates a second reference temperature or less.

* * * * *